United States Patent
Lyusin

(10) Patent No.: US 10,908,294 B2
(45) Date of Patent: Feb. 2, 2021

(54) DETECTION AND ELIMINATION OF GNSS SPOOFING SIGNALS WITH PVT SOLUTION ESTIMATION

(71) Applicant: Magellan Systems Japan, Inc., Hyogo (JP)

(72) Inventor: Sergey Lyusin, Moscow (RU)

(73) Assignee: Magellan Systems Japan, Inc., Hyogo (JP)

( * ) Notice: Subject to any disclaimer, the term of this patent is extended or adjusted under 35 U.S.C. 154(b) by 0 days.

(21) Appl. No.: 16/233,665

(22) Filed: Dec. 27, 2018

(65) Prior Publication Data

US 2019/0129041 A1   May 2, 2019

Related U.S. Application Data

(63) Continuation of application No. PCT/IB2017/058091, filed on Dec. 19, 2017.

(Continued)

(51) Int. Cl.
*G01S 19/21* (2010.01)
*G01S 19/20* (2010.01)

(52) U.S. Cl.
CPC ............ *G01S 19/215* (2013.01); *G01S 19/20* (2013.01)

(58) Field of Classification Search
CPC .. G01S 19/20–215; G01S 19/47; G01S 19/49; G01S 19/21–22
See application file for complete search history.

(56) References Cited

U.S. PATENT DOCUMENTS

| 6,466,958 B1 * | 10/2002 | Van Wechel | G01S 19/24 342/357.68 |
| 6,639,549 B2 * | 10/2003 | Vanderwerf | G01S 19/20 342/357.58 |

(Continued)

FOREIGN PATENT DOCUMENTS

WO   2016/067279   5/1916

OTHER PUBLICATIONS

Kaplan, Elliott D. et al., "Understanding GPS Principles and Applications", Second Edition, p. 550, 2006 (Year: 2006).*

(Continued)

*Primary Examiner* — Cassi J Galt
(74) *Attorney, Agent, or Firm* — Beyer Law Group LLP

(57) ABSTRACT

A GNSS spoofing signal detection and elimination includes acquiring and tracking a plurality of GNSS signals, authenticating the acquired signals based on available authentication information to determine if the acquired signals are authentic, unverified, or counterfeit, creating a first list of the authentic signals and a second list of unverified signals, by removing the counterfeit signal(s), creating a plurality of sets of the signals by selecting at least four GNSS signals such that each set includes all of the authentic signals and at least one unverified signal, calculating PVT solutions and post-fit residuals for each set, estimating authenticity of unverified signals by analyzing the PVT solutions and post-fit residuals, estimating authenticity and accuracy of PVT solutions based on the estimation, and outputting a list of all of the acquired GNSS signals with the respective authenticity, and a list of all possible PVT solutions with the respective authenticity and accuracy.

11 Claims, 5 Drawing Sheets

Related U.S. Application Data

(60) Provisional application No. 62/436,323, filed on Dec. 19, 2016.

(56) References Cited

U.S. PATENT DOCUMENTS

| | | | |
|---|---|---|---|
| 7,248,964 B2* | 7/2007 | Bye | G01C 21/165 342/357.31 |
| 7,764,224 B1 | 7/2010 | Anderson | |
| 10,018,730 B2* | 7/2018 | Youssef | G01S 19/426 |
| 2015/0145724 A1 | 5/2015 | Kana et al. | |
| 2016/0178752 A1* | 6/2016 | Davies | G01S 19/20 342/357.58 |
| 2016/0370471 A1 | 12/2016 | Mabuchi et al. | |
| 2017/0336517 A1 | 11/2017 | Petillon | |

OTHER PUBLICATIONS

Gunther, Christoph "A Survey of Spoofing and Counter-Measures" Journal of the Institute of Navigation, vol. 61., No. 3, p. 159-177, Apr. 2014.

Scott, Logan, "Anti-Spoofing & Authenticated Signal Architectures for Civil Navigation Systems" Proceedings of Ion GPS/GNSS, vol. 2003, p. 1543-1552, Jan. 2003.

International Search Report from International Application No. PCT/IB2017/058091 dated Apr. 20, 2018.

Written Opinion from International Application No. PCT/IB2017/058091 dated Apr. 20, 2018.

* cited by examiner

| Signal | Notation | Signal Frequency Range, MHz |
|---|---|---|
| GLONASS L1 | G1 | 1593 ~ 1610 |
| BeiDou B1-2 | B1-2 | 1580 ~ 1600 |
| GPS L1, Galileo E1, QZSS L1 | L1 | 1563 ~ 1587 |
| BeiDou B1 | B1 | 1551 ~ 1571 |
| Galileo E6, QZSS LEX | E6 | 1259 ~ 1299 |
| BeiDou B3 | B3 | 1259 ~ 1279 |
| GLONASS L2 | G2 | 1238 ~ 1254 |
| GPS L2, QZSS L2 | L2 | 1218 ~ 1238 |
| BeiDou B2 | B2 | 1197 ~ 1217 |
| GLONASS L3 | G3 | 1191 ~ 1211 |
| Galileo E5 | E5 | 1167 ~ 1217 |
| GPS L5, QZSS L5 | L5 | 1164 ~ 1188 |

FIG. 2

DETECTION AND ELIMINATION OF GNSS SPOOFING SIGNALS WITH PVT SOLUTION ESTIMATION

CLAIM OF PRIORITY

This application is a Continuation of International Application No. PCT/IB2017/058091 filed on Dec. 19, 2017, which claims priority to U.S. Provisional Patent Application No. 62/436,323, filed on Dec. 19, 2016, both of which are hereby incorporated by reference.

BACKGROUND OF THE INVENTION

1. Field of the Invention

The present invention relates to GNSS receivers and GNSS signal processing. More specifically, the present invention relates to detection and elimination of GNSS spoofing signals and estimation of PVT (position, velocity, and time) solutions at a GNSS receiver.

2. Description of the Related Art

Global Navigation Satellite Systems (GNSS) available today include United States Global Positioning System (GPS), Russian Global Orbiting Navigation Satellite System (GLONASS), European Union's Galileo, China's regional BeiDou Satellite Navigation System (BDS, formerly known as Compass), and Japanese Quasi-Zenith Satellite System (QZSS).

A GNSS spoofing signal is a type of structured interference that is close enough to a GNSS specification so as to appear authentic to an unsuspecting GNSS receiver. An intentional spoofer deliberately attempts to manipulate the PVT (position, velocity, and time) readout of a target GNSS receiver. For example, a GNSS spoofing attack may try to deceive a GNSS receiver by broadcasting incorrect GNSS signals, structured to resemble a set of normal GNSS signals, or by rebroadcasting genuine GNSS signals captured elsewhere or at a different time. These spoofed signals may be modified in such a way as to cause the GNSS receiver to estimate its position to be somewhere other than where it actually is, or to be located where it is but at a different time, as determined by the attacker. One common form of a GNSS spoofing attack, commonly termed a carry-off attack, begins by broadcasting signals synchronized with the genuine GNSS signals observed by the target GNSS receiver. The power of the counterfeit GNSS signals is then gradually increased and drawn away from the genuine GNSS signals.

Spoofing has become a more general concern as low-cost off-the shelf software-defined radio hardware, low-cost GNSS signal simulators, and record-and-play devices, and the like become available for a competent programmer to generate realistic civil GNSS signals. As economic and practical dependences on civil GNSS for transportation, location services, communication, finance, power distribution, and other applications increase, the consequences of GNSS spoofing become more serious. Accordingly, finding effective anti-spoofing measure in GNSS receivers is one of the urgent issues.

BRIEF DESCRIPTION OF THE INVENTION

The embodiments of the present invention provide a method for detecting and eliminating a GNSS spoofing signal with PVT solutions. The method includes (a) acquiring and tracking a plurality of GNSS signals from selected GNSS satellites, (b) authenticating each of the acquired GNSS signals based on available authentication information for the acquired GNSS signals, thereby identifying each of the acquired GNSS signals as authentic, unverified, or counterfeit, (c) generating and storing a first list of the GNSS signals identified as authentic and a second list of GNSS signals identified as unverified, (d) continuing tracking and further processing the authentic signals and the unverified signals, while removing the GNSS signals identified as counterfeit from tracking and further processing, (e) creating a plurality of sets of the GNSS signals by selecting at least four GNSS signals from among the first and second lists of the GNSS signals, each set including all of the authentic GNSS signals on the first list and at least one unverified GNSS signal from the second list, (f) calculating position, velocity, and time (PVT) solutions and post-fit residuals for each of the plurality of sets based on the GNSS signals therein, (g) estimating authenticity of each of the unverified signals by analyzing the PVT solutions and post-fit residuals obtained from the respective sets including the corresponding unverified signals, (h) estimating authenticity and accuracy of each of the PVT solutions based on the estimated authenticity of the unverified signals, and (i) generating and outputting a list of all of the acquired GNSS signals with the respective authenticity thereof, and a list of all possible PVT solutions with the respective authenticity and accuracy thereof.

The acquiring and tracking the plurality of GNSS signals may includes (a1) determining an area of search for each GNSS signal which is potentially visible to the antenna based on assistance information on the corresponding GNSS satellite, (a2) searching in the area for a target GNSS signal from the corresponding GNSS satellite, (a3) continuing searching in the area after acquiring the target GNSS signal until the entire area is searched, whereby acquiring any additional GNSS signal also corresponding to the target GNSS signal, and (a4) tracking the target GNSS signal and the any additional GNSS signal for each of the selected GNSS satellites.

The area of search may include a time delay search range and a frequency search range.

In accordance with one embodiment of the present invention, the selected GNSS satellites may include satellites from different GNSS's. The GNSS signals may include GNSS signals in different frequency bands.

The authentication information may include a security code included in the acquired GNSS signal, and information for verifying authenticity of the GNSS signal obtained separately from the GNSS signal.

The calculation of the PVT solutions may include obtaining positional information from at least one sensor. The at least one sensor may include at least one of an optical sensor and an inertial sensor, and the positional information may include a trajectory of a GNSS receiver.

The GNSS receive may output the PVT solutions having the highest authenticity and accuracy as a GNSS receiver output.

In accordance with one embodiment of the present invention, the method of detecting and eliminating a GNSS spoofing signal with PVT solutions may be implemented in a non-transitory computer-readable storage medium with an executable program stored thereon, wherein the program instructs a microprocessor to perform the above-described method.

BRIEF DESCRIPTION OF THE DRAWINGS

The present invention is illustrated by way of example, and not by way of limitation, in the FIGs. of the accompanying drawings and in which like reference numerals refer to similar elements and in which:

FIG. 2 is a table showing examples of currently available GNSS signals from different GNSS systems (GPS, GLONASS, Galileo, BeiDou, and QZSS) and their frequency ranges.

DETAILED DESCRIPTION OF EMBODIMENTS OF THE INVENTION

The present invention provides detection and elimination of GNSS spoofing signals in GNSS receivers with estimated PVT solutions. The invention protects such GNSS receivers against spoofing attacks.

Figure 1:
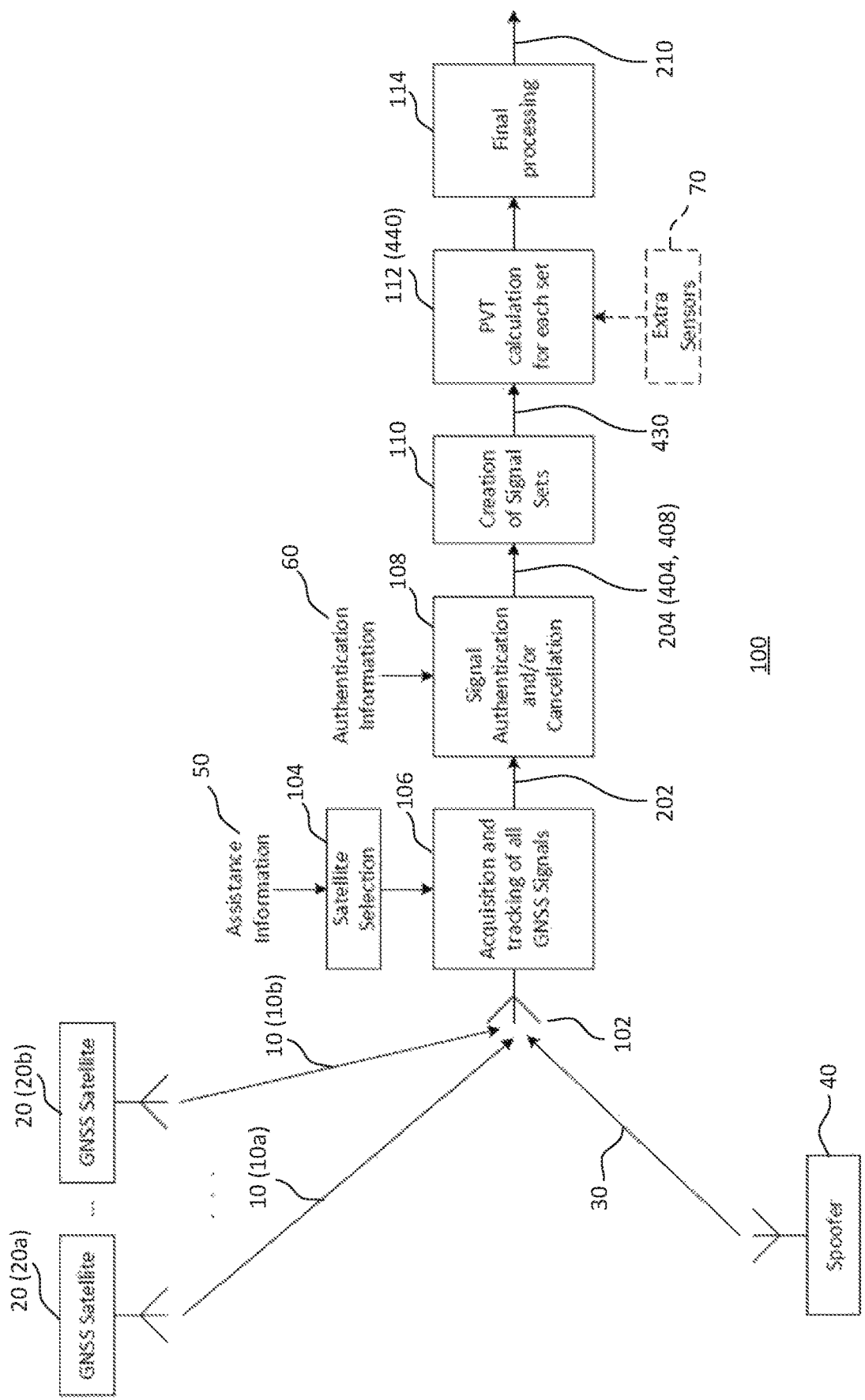
FIG. 1 is a block diagram schematically illustrating a method for detecting and eliminating GNSS spoofing signals and obtaining PVT solutions in accordance with one embodiment of the present invention.

FIG. 1 is a block diagram schematically illustrating a method for detecting and eliminating GNSS spoofing signals and obtaining PVT solutions in accordance with one embodiment of the present invention. The method may be implemented in a GNSS receiver 100 for a navigation device and the like. Functional blocks in FIG. 1 also correspond to schematic structure of the GNSS receiver 100. The GNSS receiver 100 implementing the present invention may be configured as a computer including a CPU, a memory (RAM, ROM), and the like therein so as to have the illustrated functional blocks. These functional blocks may be realized by means of software/computer programs realizing the respective functions, but a part or the whole of them may be realized by hardware.

The GNSS receiver 100 receives GNSS signals 10 (10*a*, 10*b* . . . ) from a plurality of GNSS satellites 20 (20*a*, 20*b* . . . ) at an antenna 102 thereof. The GNSS receiver 100 also receives a counterfeit signal (GNSS spoofing signal) 30 from a spoofer device 40.

FIG. 2 shows examples of currently available GNSS signals from different GNSS systems (GPS, GLONASS, Galileo, BeiDou, and QZSS) and their frequency ranges. Each GNSS has three or more frequency bands. The GNSS receiver 100 may obtain assistance information 50 regarding the currently available GNSS satellites, such as the GNSS satellites which are potentially visible from the GNSS receiver's approximate position and time (the antenna's position). Such assistance information may be stored in a memory of the GNSS receiver 100 or obtained through a connection link such as the Internet or radio communication. The assistance information 50 may be transmitted from a base station (server) to the GNSS receiver 100 (client receiver unit). The assistance information 50 may include frequency and timing information of the GNSS signal, the sequence of navigation data bits from each GNSS satellite, ephemeris information for determining the positions of the GNSS satellites, and the like.

Based on available assistance information 50, a plurality of GNSS satellites are selected for acquisition and tracking (104). For example, all GNSS satellites which are potentially visible from the antenna 102 (antenna position) of the GNSS receiver 100 may be selected.

All of the available GNSS signals 10 from the selected GNSS satellites 20 that the GNSS receiver 100 can receive may be received for acquisition and tracking (106). The selected GNSS satellites 20 may include a plurality of satellites from different GNSSs, for example, GPS, GLONASS, Galileo, QZSS, etc. The selected GNSS satellites 20 may be a plurality of satellites from the same GNSS, for example GPS. The plurality of GNSS signals 10 may include GNSS signals in different frequency bands, or may be in the same frequency band, depending on the receiving bandwidth of GNSS receiver 100. The GNSS signals 10, which are used for tracking, may be pre-processed by filters with a different bandwidth in order to reduce processing complexity.

Figure 3:
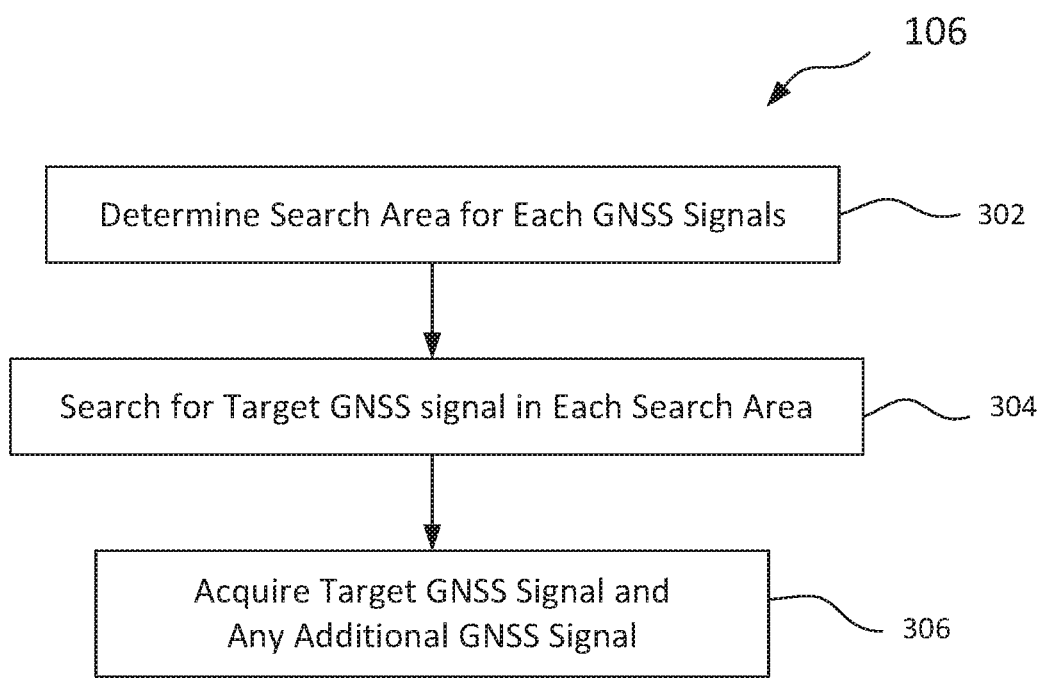
FIG. 3 is a flow chart showing details of the acquisition and tracking process in accordance with one embodiment of the present invention.

FIG. 3 shows details of the acquisition and tracking process 106. As shown in FIG. 3, an area of search for each GNSS signal 10 is determined (302) based on the information on the corresponding GNSS satellite and its GNSS signals, for example, obtained from the assistance information 50. The search area may be defined in the frequency-delay dimension. The frequency range to be searched for the acquisition may be determined from preciseness of the frequency information of the GNSS signal 10, frequency uncertainty in a local oscillator of the GNSS receiver 100, and any other frequency-related errors and uncertainties. The time-delay range to be searched for the acquisition may also be determined from preciseness of the timing information of the GNSS signal 10, time-delay uncertainty on the side of GNSS receiver 100, and any other time-related errors and uncertainties. The frequency search range and the time-delay search range may define the respective search area for each GNSS signal 10 (a target GNSS signal) from the corresponding GNSS satellite (a target GNSS satellite).

Each search area is searched for acquiring the corresponding target GNSS signal (304). The search is continued even after the target GNSS signal is acquired until the entire area is searched, such that any additional GNSS signal corresponding to the target GNSS signal is also acquired. This is because the spoofer device 40 may transmit a disguised GNSS signal(s) to the GNSS receiver 100, as mentioned above. The acquired GNSS signals, including the target GNSS signal and any additional GNSS signal(s) for each of the selected GNSS satellites are tracked (306). In addition, only the GNSS signals having energy that is not less than a predetermined threshold may be selected for further tracking.

Returning to FIG. 1, each of the acquired GNSS signals 202 are authenticated based on available authentication information 60 for the acquired GNSS signals (108), so as to identify each of the acquired GNSS signals as authentic (verified), unverified (questionable), or counterfeit/spoofing. For example, one or more of the acquired GNSS signals 202 may be a security-enhanced GNSS signal that includes a security code therein. Such a security code may be fully encrypted or contains periodic authentication codes such that some or all of its symbols are unpredictable to a would-be spoofer. By obtaining the security code from another link as the authentication information 60, the acquired GNSS signals 202 can be verified by correlating with the security code sequence. Such a security code may be preliminary obtained as a digital key, or transmitted in real time by a communication link and the like. Any other authentication information may also be used for the authentication process 108.

Figure 4:
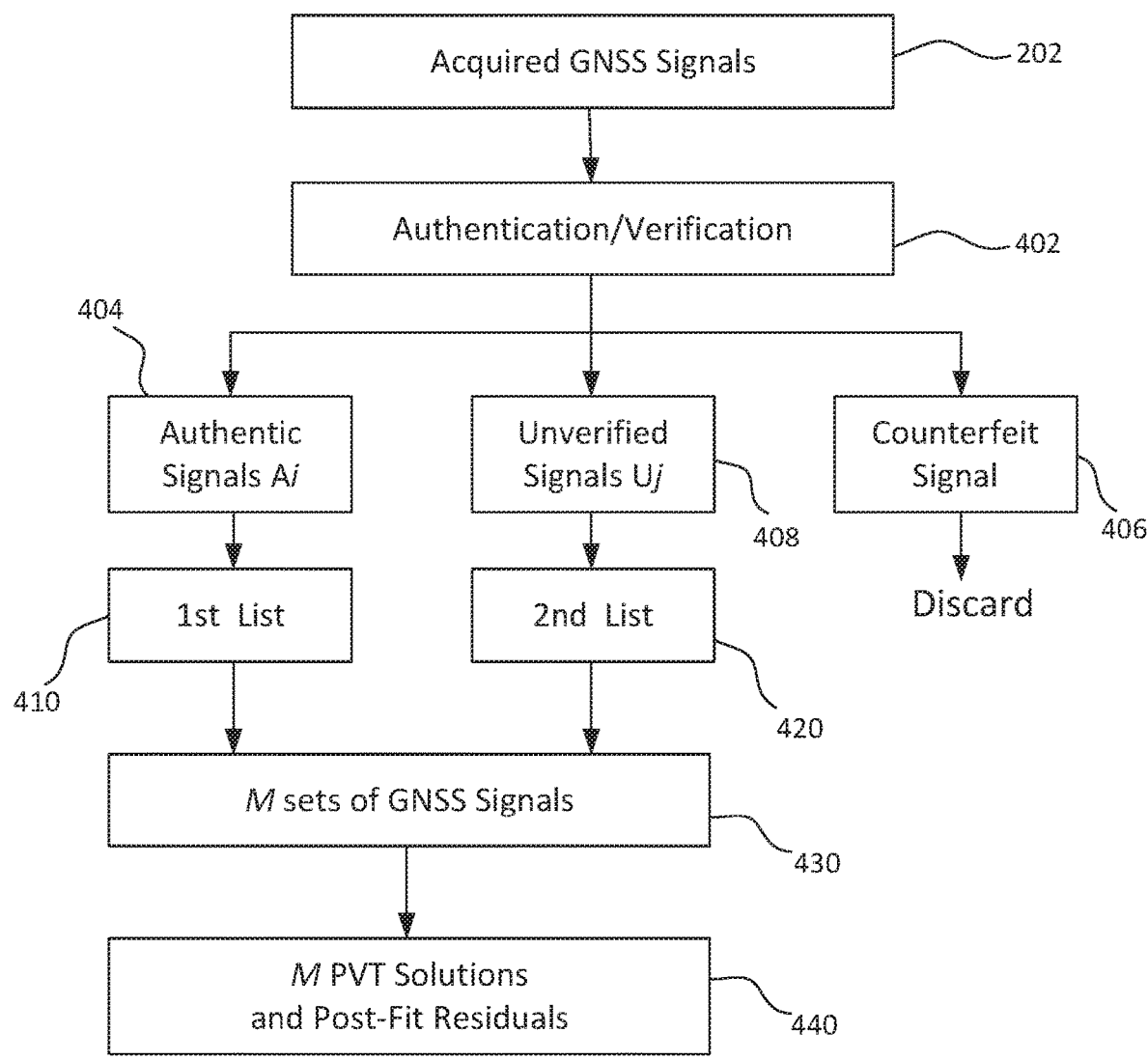
FIG. 4 is a diagram schematically illustrating details of the signal authentication and/or cancellation process and the creation of the list and a plurality of sets of the acquired GNSS signals in accordance with one embodiment of the present invention.

FIG. 4 illustrates more details of the signal authentication and/or cancellation (108), the creation of signal sets (110), and the PVT calculation of each set (112) in FIG. 1. As shown in FIG. 4, the acquired GNSS signals 202 undergo the authentication/verification process 402. The verified GNSS signals are identified and labeled (flagged) as "authentic" signal (404), and the GNSS signals which failed such verification/authentication are labeled (flagged) as "counterfeit" or "spoofing" (406). For example, if an authentic signal for the target GNSS signal has been found in the search area, any other GNSS signal(s) acquired in the same search area would be a counterfeit signal of the target GNSS signal. If an acquired GNSS signal fails the corresponding verification or authentication process, such a GNSS signal is also determined to be as counterfeit. The acquired GNSS signals for which no authentication information is available or no authentication process is performed are labeled (flagged) as "unverified" (408). The GNSS signals, which are determined as counterfeit or spoofing signals, are discarded or eliminated from further processing, for example, by stopping tracking of the counterfeit signals.

As a result of the authentication and/or cancellation process, two lists are generated from the flagged GNSS signals 404 and 408: a first list 410 of the authentic GNSS signals Ai and a second list 420 of unverified GNSS signals Uj. The generated lists 410 and 420 may be stored in a memory (not shown) of the GNSS receiver 100 and further processing is performed on the listed authentic and unverified GNSS signals.

Referring back to FIG. 1, a plurality of sets of the GNSS signals are created (110) by selecting at least four (4) GNSS signals from among the first and second lists of the GNSS signals 204 (404, 406), such that each set includes all of the GNSS signals on the first list 410 (i.e., all of the authentic signals Ai) and at least one GNSS signal from the second list 420 (i.e., at least one unverified signal Uj).

For example, if there are four or more authentic GNSS signals Ai, it is possible to create a first set including only the authentic signals so as to calculate authentic navigation solutions for position, velocity, and time (PVT). In such a case, the first set of authentic signals Ai may produce the most reliable PVT solutions, and thus other sets of signals may not be necessary to obtain the PVT solutions. However, for the purpose of detecting any possible spoofing signal(s), other sets of GNSS signals may be created and the PVT solutions may be calculated in a similar manner as that described below.

If the number of the authentic signals Ai is three or less and the remaining signals are all unverified (questionable) signals Uj, a plurality (M) of sets 430 are created (112 in FIG. 1), and the PVT solutions and post-fit residuals 440 are calculated for each set (114 in FIG. 1).

For example, if three authentic GNSS signals A1, A2, and A3 and m unverified GNSS signals U1, U2 . . . Um have been acquired and tracked, m sets of the acquired GNSS signals (i.e., M=m) may be created such that each set includes the three authentic signals A1, A2, A3, and one unverified signal Uj (j=1, 2, . . . m). The PVT solutions and post-fit residuals are calculated for each of the m sets of the GNSS signals. For example, m estimated positions of the GNSS receiver 100 may be obtained from the calculated PVT solutions and the post-fit residuals. By analyzing the m estimated positions, for example, by plotting the estimated positions on the coordinate plane or the easting-northing plane, it may found that one or more positions are deviated more than a statistically expected value, indicating that the corresponding set(s) may include a spoofing GNSS signal.

In the case where there are two authentic GNSS signals A1 and A2, and m unverified GNSS signals U1, U2 . . . Um have been acquired and tracked, it is possible to create $mC2=m(m-1)/2$ sets of the acquired GNSS signals where each set includes the two authentic signals A1 and A2, and two unverified signals Uj and Uk (j=1, 2, . . . m, k=1, 2, . . . m, j<k). In order for the full analysis, the PVT solutions and post-fit residuals are calculated for each of the $m(m-1)/2$ sets of the GNSS signals to produce, for example, $m(m-1)/2$ estimated positions of the GNSS receiver 100 and the post-fit residuals.

The number of sets M is not necessarily $m(m-1)/2$, but may be reduced, if the number m is large and/or if it can be assumed that the number of spoofing signal is one (1). For example, only m sets of GNSS signals may be created such that each set includes authentic GNSS signals A1 and A2, and unverified GNSS signals Uj and Uk (j=1, 2, . . . m, k=1, 2, . . . m, k=j+1 where j<m, k=1 where j=m). If unverified GNSS signal Us is the spoofing signal, two sets including Us (when j=s and j+1=s) would produce PVT solutions greatly deviated compared with other PVT solutions. Any statistical threshold value(s) can be used for the determination of spoofing signal. Any other statistical method can be used to estimate and evaluate authenticity of unverified GNSS singles from the calculated PVT solutions.

Figure 5:
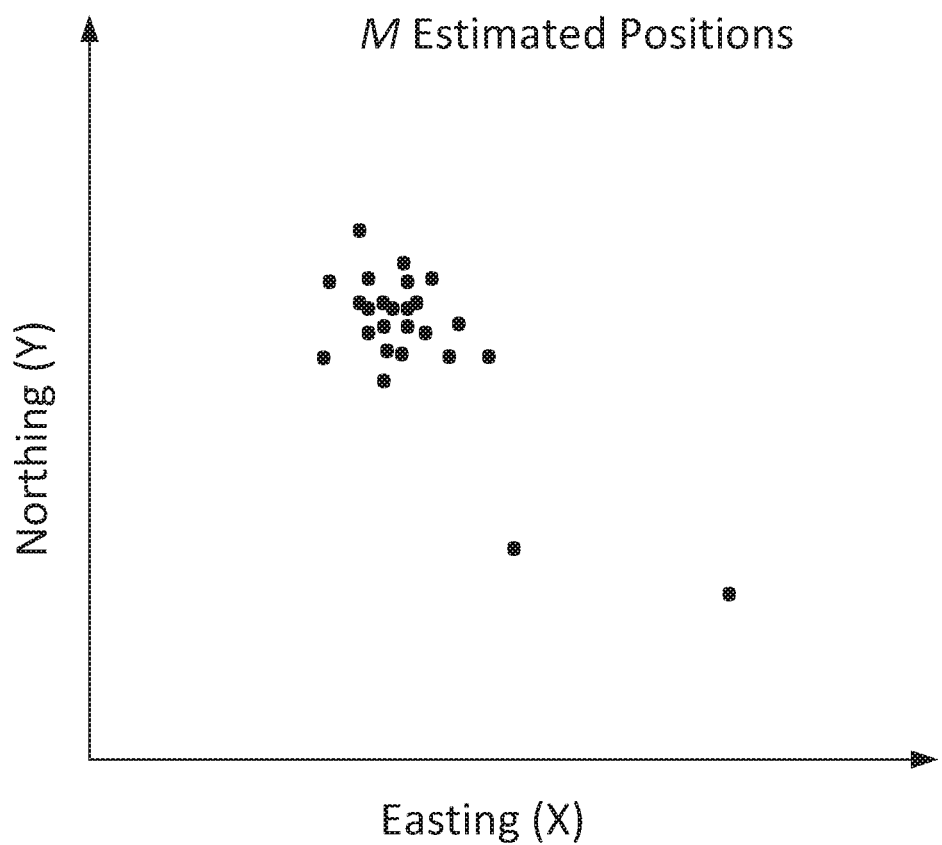
FIG. 5 is a diagram schematically and conceptually illustrates an example of plotting M estimated positions of the GNSS receiver.

In the case where there is only one authentic GNSS signal A1, and m unverified GNSS signals U1, U2 . . . Um have been acquired and tracked, it is possible to create $mC3=m(m-1)(m-2)/6$ sets of the acquired GNSS signals where each set includes the authentic signal A1 and three unverified signals Uj, Uk, and Ul (j=1, 2, . . . m, k=1, 2, . . . m, l=1, 2, . . . m j<k<l). In order for the full analysis, the PVT solutions and post-fit residuals are calculated for each of the $m(m-1)(m-2)/6$ sets of the GNSS signals to produce, for example, $M=m(m-1)(m-2)/6$ estimated positions of the GNSS receiver 100 and the post-fit residuals. However, the number of the sets M, i.e., the number of the estimated PVT solutions, may be reduced in a similar manner as above, or using any statistical method or scheme. In addition, the number of the acquired GNSS signals in the set is not limited to four, and the similar statistical measure when each set includes five or more acquired GNSS signals, FIG. 5 schematically and conceptually illustrates such a plot of M estimated positions of the GNSS receiver. Based on the extent of the deviation compared with a statistical deviation, the authenticity of each unverified GNSS signal Uj may be estimated. Other PVT solutions, i.e., velocity and time may also be calculated, and the authenticity of each unverified GNSS signal Uj may be estimated based on any combination of position, velocity, and/or time.

In addition, as shown in FIG. 1, other information or data from at least one sensor 70 may also used in calculating the PVT solutions and post-fit residuals calculation. For example, when the position (coordinates) of the GNSS receiver is calculated, an optical sensor and/or an inertia sensor may be used to obtain the GNSS receiver's trajectory. In accordance with one embodiment of the present invention, the coordinates and post-fit residuals may be calculated sequentially in time using the Kalman filter.

Finally, the authenticity and accuracy of each of the PVT solutions are estimated based on the estimated authenticity of the GNSS signals (114). For example, the following information is outputted: a list of all received GNSS signals; the verified or estimated authenticity of each of the received GNSS signals (with low authenticity indicating possible spoofing attack); a list of all possible PVT solutions; and estimated authenticity and accuracy of each PVT solution.

The PVT solution having the highest authenticity and accuracy may be outputted as a GNSS receiver output 210.

In accordance with one embodiment of the present invention, the method as described above may be implemented in a non-transitory computer-readable storage medium with an executable program stored thereon. The program instructs a microprocessor to perform the method described above.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method for detecting and eliminating a global navigation satellite system (GNSS) spoofing signal using position, velocity, and time (PVT) solutions, the method comprising:
    acquiring and tracking a plurality of target GNSS signals from selected GNSS satellites, including:
        determining an area of search for each target GNSS signal from a corresponding GNSS satellite which is potentially visible to an antenna of a GNSS receiver based on assistance information on the corresponding GNSS satellite;
        searching in the determined area for the target GNSS signal;
        continuing searching in the area after acquiring a first candidate signal for the target GNSS signal until the entire area is searched, whereby acquiring any additional candidate signals for the target GNSS signal; and
        tracking thus acquired one or more candidate signals for each of the plurality of target GNSS signals from the selected GNSS satellites;
    identifying each of the acquired candidate signals as authentic, unverified, or counterfeit based on available authentication information
    removing the acquired candidate signals identified as counterfeit from the tracking, while continuing tracking the candidate signals identified as authentic or unverified;
    generating and storing a first list of the authentic GNSS signals which are the target GNSS signals each having a single candidate signal identified as authentic, and a second list of unverified GNSS signals which are the target GNSS signals each having one or more candidate signals identified as unverified, at least one target GNSS signal having a plurality of unverified candidate signals;
    creating a plurality of sets of the GNSS signals by selecting at least four target GNSS signals from among the first and second lists, each set including all of the authentic GNSS signals on the first list, if any, and one or more unverified GNSS signals from the second list, the plurality of unverified candidate signals of the at least one target GNSS signal being included in a corresponding plurality of sets, such that each set includes only one candidate signal for each target GNSS signal therein;
    calculating position, velocity, and time (PVT) solutions and post-fit residuals for each of the plurality of sets based on the GNSS signals therein, thereby obtaining a certain number of estimated solutions corresponding to the plurality of sets;
    estimating authenticity of each of the unverified GNSS signals included in each set, by statistically analyzing the certain number of estimated solutions obtained from the respective sets;
    estimating authenticity and accuracy of each of the certain number of estimated solutions based on the estimated authenticity of the one or more unverified GNSS signals in the corresponding set from which the PVT solutions and post-fit residual are calculated; and
    generating and outputting a list of all of the acquired target GNSS signals, including the one or more candidate singles thereof, with the respective authenticity thereof, and a list of all possible PVT solutions with the respective authenticity and accuracy thereof.

2. The method of claim 1, wherein the area of search includes a time delay search range and a frequency search range.

3. The method of claim 1, wherein the selected GNSS satellites include satellites from different GNSS's.

4. The method of claim 1, wherein the target GNSS signals include GNSS signals in different frequency bands.

5. The method of claim 1, wherein the authentication information includes:
    a security code included in the acquired candidate signal; and
    information obtained separately from the candidate signal for verifying the security code for the corresponding target GNSS signal.

6. The method of claim 1, wherein the calculating the PVT solutions includes:
    obtaining positional information from at least one sensor.

7. The method of claim 6, wherein the at least one sensor includes at least one of an optical sensor and an inertial sensor.

8. The method of claim 6, wherein the positional information includes a trajectory of a GNSS receiver.

9. The method of claim 1, further comprising:
    outputting the PVT solution having the highest authenticity and accuracy as a GNSS receiver output.

10. A non-transitory computer-readable storage medium with an executable program stored thereon, wherein the program instructs a microprocessor to perform the method of claim 1.

11. A GNSS receiver including a computer configured to perform the method of claim 1.

* * * * *